United States Patent [19]

Hsieh

[11] Patent Number: 5,056,081

[45] Date of Patent: Oct. 8, 1991

[54] SYSTEM AND METHOD FOR ERASING LIGHT-RESPONSIVE OPTICAL DISKS

[75] Inventor: Der-Chang Hsieh, Cupertino, Calif.

[73] Assignee: Tandy Corporation, Fort Worth, Tex.

[21] Appl. No.: 459,923

[22] Filed: Jan. 2, 1990

[51] Int. Cl.⁵ .............................................. G11B 7/00
[52] U.S. Cl. ...................................... 369/100; 360/66;
369/275.2; 346/76 L; 365/106
[58] Field of Search ..................... 360/66, 114; 369/13,
369/100, 275.2; 365/113, 106, 218; 346/76 L,
135.1

[56] References Cited

U.S. PATENT DOCUMENTS 4,719,615 1/1988 Feyrer et al. ......................... 369/284
4,805,043 2/1989 Doyle ............................... 360/114 X

*Primary Examiner*—Robert L. Richardson
*Attorney, Agent, or Firm*—Townsend & Townsend

[57] ABSTRACT

A system and method for erasing data on an optical storage disk of the type which is responsive to light of first selected characteristics to produce a detectable physical change in the disk and is further responsive to light of second selected characteristics to reverse the physical change. Erasure is effected by rotating the disk proximate a linear light source capable of projecting a curtain of light having said second selective characteristics onto the disk. Uniform erasure of the data may be obtained by modifying the light flux which is delivered to the disk as a function of distance from the center of the disk. In particular, by increasing the flux or flux density which strikes the disk proximate its periphery relative to that which strikes near the center, the unit dosage received by any portion of the disk may be equalized.

26 Claims, 4 Drawing Sheets

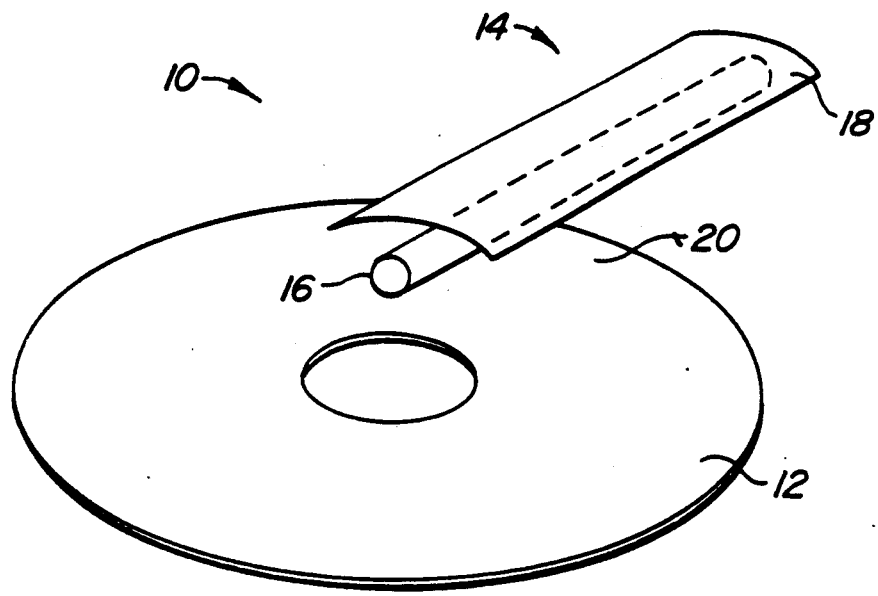
FIG._1.
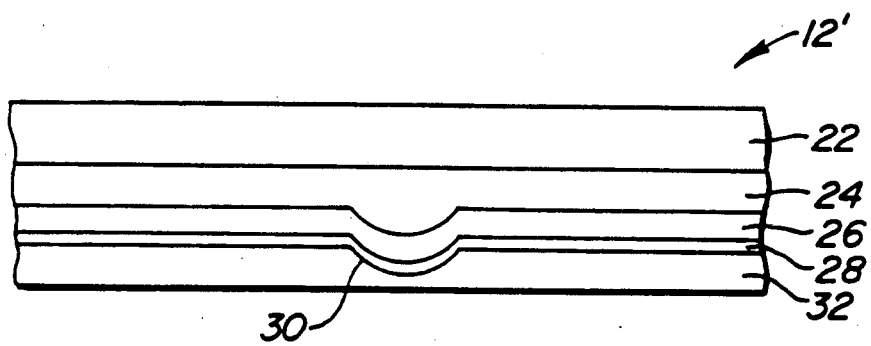
FIG._2.
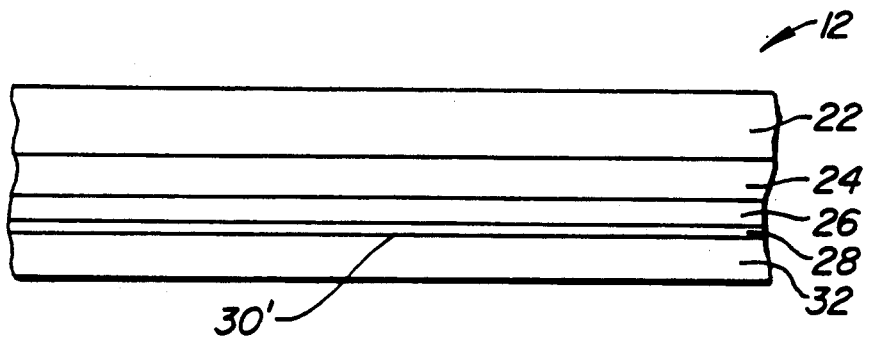
FIG._3.

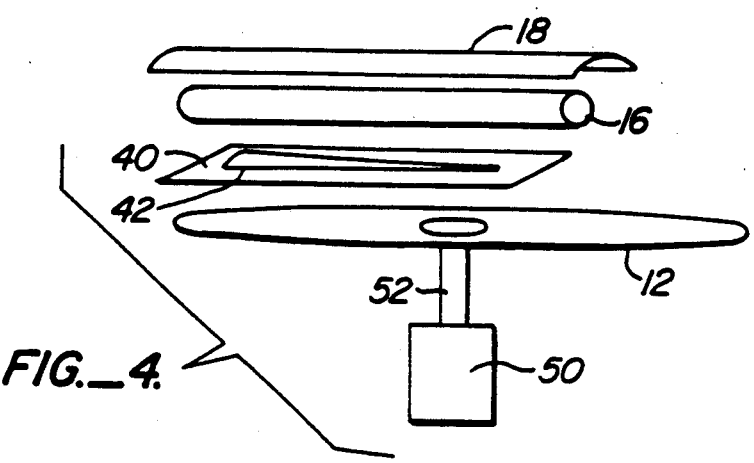
FIG._4.
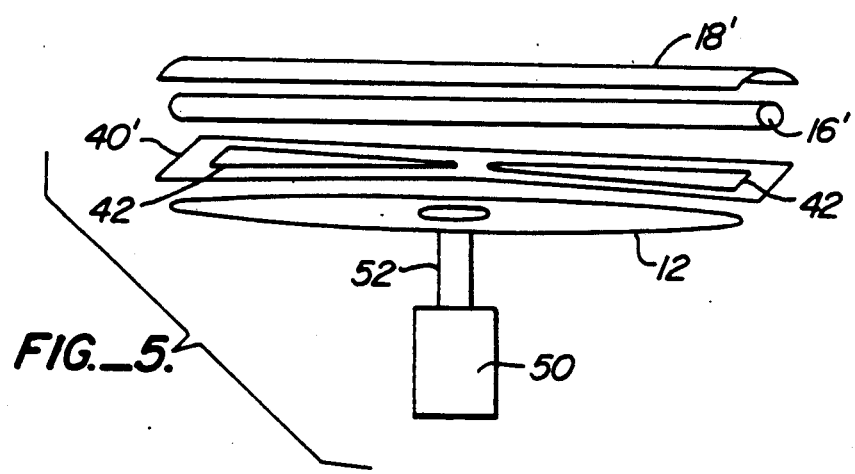
FIG._5.
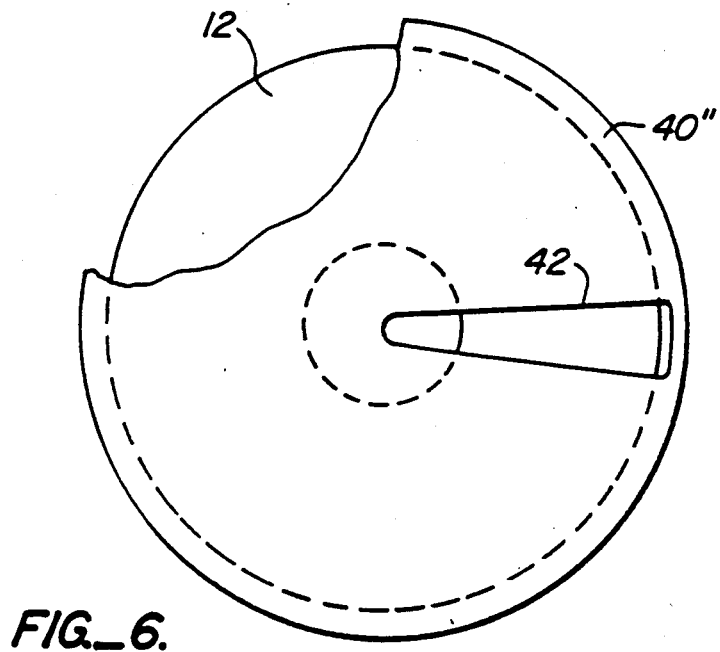
FIG._6.

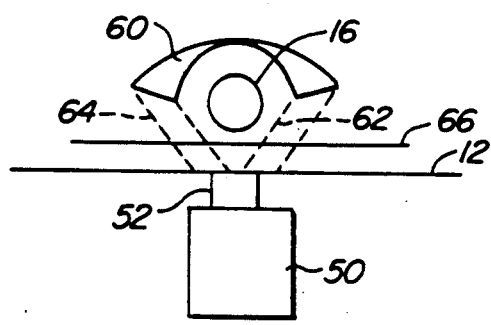
FIG._7.
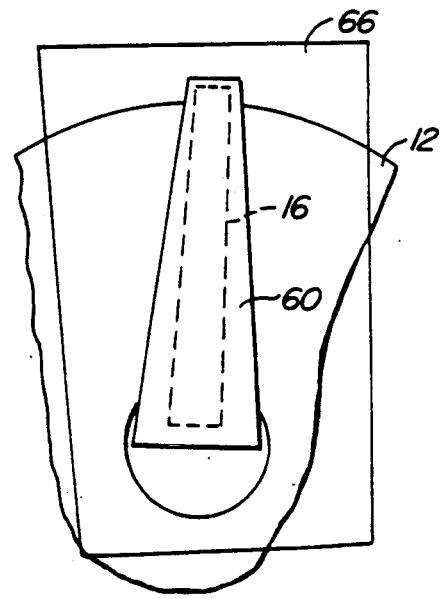
FIG._8.
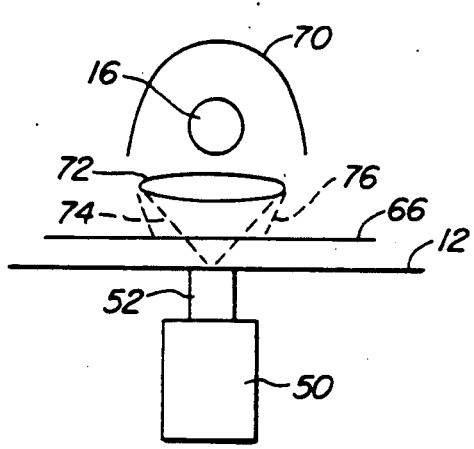
FIG._9.
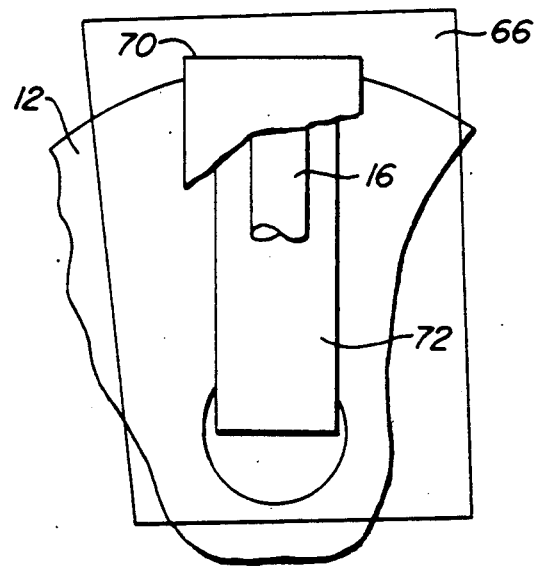
FIG._10.

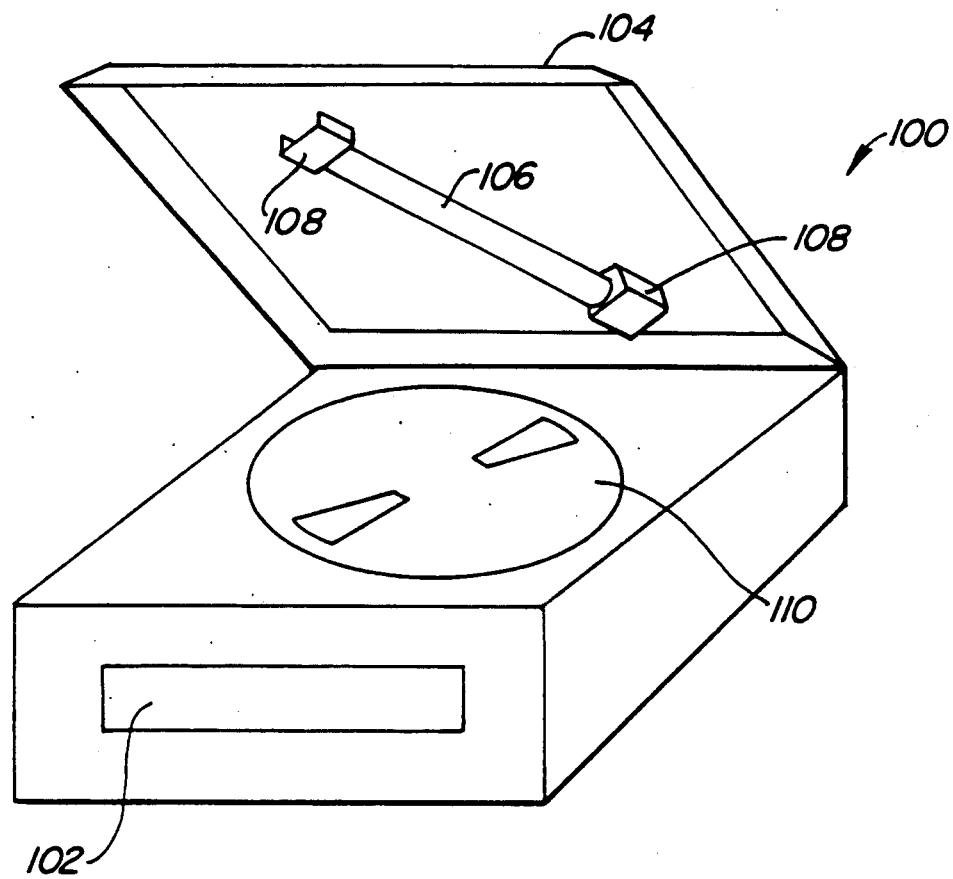
FIG._11.

SYSTEM AND METHOD FOR ERASING LIGHT-RESPONSIVE OPTICAL DISKS

BACKGROUND OF THE INVENTION

1. Field of the Invention

The present invention relates generally to the field of optical recording media and in particular to the systems and methods for erasing data present on light-responsive optical disks.

2. Description of the Background Art

Optical storage media have become well-known to the public in the form of compact disks for audio and somewhat larger laser disks for combined audio and video. Both types of disks are similar in structure, including a reflective surface protected by a clear plastic substrate layer. Small pits formed in the reflective surface represent data in binary form, and the disks are read by a player which rotates the disk and focuses a laser beam through the substrate layer onto the reflective surface. The presence of a pit increases the optical path of the laser beam by an amount equivalent to a half-wavelength, thereby producing destructive interference when combined with other (non-shifted) reflected beams. The presence of data thus takes the form of a drop in intensity of the reflected light detected by the player.

While compact disks have been enormously successful, presently available commercial disks allow only the playback of pre-recorded information and are not suitable for recording and reuse. To overcome this limitation, various systems for providing recordable and reusable optical storage media have been proposed.

Of particular interest to the present invention are the media and recording systems of the type described in Feyrer U.S. Pat. No. 4,719,615 and copending application Ser. Nos. 152,690; 294,723; 57,377; 357,504; 357,506; 414,044; and 414,041; the disclosures of which are incorporated herein by reference.

The medium disclosed in Feyrer et al. includes a lower expansion layer of a rubbery material which expands when heated. The expansion layer is coupled to an upper retention layer which is glassy at ambient temperature but which becomes rubbery when heated. Both layers are supported on a rigid substrate, and the expansion and retention layers each contain dyes for light absorption at different wavelengths. Data are recorded by directing laser light onto the medium to heat and expand the expansion layer away from the substrate, thus forming a protrusion or bump extending into the retention layer. As the expansion layer expands, the retention layer is heated above its glass transition temperature so that it can deform to accommodate the bump. After the beam is turned off, the retention layer cools to its glassy state before the bump contracts, thereby fixing the bump in the medium.

Reading or playback of the data is then achieved by low intensity "read" laser beam which is focused on the partially reflecting interface between the retention layer and the surrounding air. When the beam encounters the bump, some of the reflected light is scattered, while other portions of the reflected light destructively interfere with the reflected light from flat areas. The resulting drop in intensity is detected by the player.

Data thus recorded on the optical media can be erased using a second laser beam at an "erase" wavelength which is preferentially absorbed by the retention layer but not the expansion layer. The erase beam heats the retention layer to a rubbery state where its viscoelastic forces (and typically in combination with those of the expansion layer) return it to its original flat configuration. While the optical media described in the copending patent applications vary in the details of construction, they all generally allow for writing data with a laser beam at a first wavelength and, optionally, erasing the data with a laser beam operating at a second wavelength.

While most proposed optical disk recording systems allow for erasure using a laser beam which tracks the recorded data points, such systems have a number of disadvantages. First, the need to pass the erase laser beam sequentially over the recorded data tracks is time consuming and will be a significant limitation when erasure is being performed without simultaneous re-recording of data. Second, the use of a laser beam to erase data on an optical disk is constrained by the need to provide sufficient energy transfer to relax the retention layer without overheating either the retention or expansion layers. Because of minor variations in the material characteristics, the use of a laser beam to erase can result in minor variations in the flatness which is ultimately achieved in the retention layer. Finally, use of a laser beam for erasure increases the likelihood of non-uniform thermal effects in the retention and expansion layers. Over time, such non-uniformities can result indegradation of the optical media.

For these reasons, it would be desirable to provide systems and methods for optical disk erasure which do not require tracking of a laser beam sequentially over the disk. In particular, such systems and methods should allow for bulk erasure of the disk in a very short time, preferably within seconds or less. The erasure achieved should be complete with no bumps or protrusions remaining on the media and result in uniform thermal effects in order to assure that all portions of the disk are treated under substantially identical conditions.

SUMMARY OF THE INVENTION

A system and method for erasing light-responsive optical recording disks operate by rotating the disk relative to a curtain of light having the characteristics selected to reverse certain physical changes which represent data on the disk. The curtain of light extends radially across at least one-half the disk surface and sweeps across said surface as the disk is rotated. The resulting light exposure provides complete and uniform erasure of the data on the disk and does not require passage of a laser beam sequentially over the data tracks to effect erasure. Thus, disks can be completely and rapidly erased to provide a clean disk ready for reuse. In a particular embodiment, the system includes means for rotating the disk about a fixed axis in a preselected plane. A light tube is disposed parallel to the plane and extends radially from the axis. In this way, the light tube is able to project a radial stripe of light which sweeps across the surface as the disk is rotated.

Preferably, means will be provided to modify the light flux which strikes the disk as a function of radial position along the projected stripe. It will be appreciated that the total dosage of light which is received by a particular location on the disk depends both on the light density and on the total exposure time to the light. For locations which are positioned further from the axis of rotation, the total exposure time will be decreased (compared to locations which are positioned closer to the axis) because the tangential velocity is greater for a fixed angular velocity. By modifying the distribution of light flux along the radial stripe, the uniformity of treatment can be enhanced. In particular, by decreasing the amount or intensity of the light flux which strikes the disk near its center, the total dosage received by locations across the disk will be equalized.

Specific approaches for modifying the light flux include placement of a mask having a variable aperture between the light tube and the optical disk. In this way, the total light flux which is passed to the disk may be modified as described above. Alternatively, the intensity profile of light from the light tube may be modified by using a reflector and/or lens having characteristics which vary along the tube length. By decreasing that portion of the light flux which exceeds the maximum threshold allowed for erasure as a function of radial position, the total dosage received by various locations on the disk can be equalized.

BRIEF DESCRIPTION OF THE DRAWINGS

FIG. 1 illustrates an exemplary embodiment of a disk erasure system constructed in accordance with the principles of the present invention.

FIG. 2 is a cross-sectional view of a typical optical disk media having a data bump therein which may be erased using the system and method of the present invention.

FIG. 3 is a cross-sectional view similar to FIG. 2, except that the data bump has been erased.

FIG. 4 illustrates an optical disk erasure system similar to that of FIG. 1, further including a mask for modifying the light flux which strikes the optical recording disk.

FIG. 5 is an optical disk erasing system similar to FIG. 4, except that the light tube and mask extend diametrically across the entire disk surface.

FIG. 6 illustrates an alternative construction of a light mask usable with the optical disk erasing systems of FIGS. 4 and 5.

FIG. 7 is an elevational view of an optical disk erasing system constructed in accordance with the principles of the present invention, employing a reflector for modifying the light intensity of light projected onto the optical disk.

FIG. 8 is a partial top view of the system illustrated in FIG. 7.

FIG. 9 is an elevational view of an optical disk erasing system constructed in accordance with the principles of the present invention, employing a lens for modifying the flux intensity of light projected on the optical disk.

FIG. 10 is a partial top view of the system of FIG. 9, with portions broken away.

FIG. 11 illustrates a preferred construction of an optical disk player incorporating an erasure system according to the principles of the present invention.

DESCRIPTION OF THE SPECIFIC EMBODIMENTS

The basic principles of the present invention are best described with reference to FIG. 1. A system 10 is capable of holding and rotating a light-responsive optical recording disk 12 adjacent to a light source 14, typically comprising a light tube 16 and a focusing assembly, such as a reflector 18. The light tube 16 and reflector 18 together project a curtain of light onto the disk 12, resulting in a stripe of light 20 disposed radially across at least one-half of the disk surface. Thus, as the disk 12 is rotated, the stripe 20 will sweep across the entire disk surface. By properly selecting the light flux, rotational speed of the disk, and total exposure time, the unit exposure or dosage of each area on the disk can be controlled to provide complete erasure of data without overexposure of the disk which can be deleterious effects, as discussed above.

The nature of the optical recording disk media is not critical, and the present invention can be utilized with virtually any media which is responsive to light of first selected characteristics to produce a detectable physical change and which is further responsive to light of second selected characteristics to reverse said physical change. The physical change may be geometric information, color change, or the like, usually comprising thermal expansion. Exemplary of such optical recording media are thermo-optical disks of the type described in Feyrer U.S. Pat. No. 4,719,615 and the various copending applications which have previously been incorporated herein by reference. A particular optical recording media suitable for use with the system and method of the present invention is described with reference to FIGS. 2 and 3 as follows.

The illustrative disk 12' includes a rigid substrate 22 which is transparent to the wavelength of light used to erase (and record) data on the disk 12. An expansive layer 24 is formed adjacent the substrate layer 22 and is characterized by a high coefficient of thermal expansion, particularly when compared to the other layers of the disk. The expansive layer 24 is at least partially absorptive to the selected light wavelength(s) used for recording on the disk so that it will expand as a result of heat generated in the disk when the light of the selected characteristics is exposed thereto. A retention layer 26 is provided adjacent the expansion layer 24 and is formed from a material which has a glass transition temperature which is above ambient temperature but below the temperature achieved by the expansion layer when heated during recordation. Optionally, the retention layer 26 may be at least partially absorptive to the wavelength of light used in recordation in order to enhance heating to above the glass transition temperature.

Reflective layer 28 is provided adjacent the retention layer and serves to reflect incident light back through the retention layer, expansion layer 24, and substrate layer 22. The reflective layer 28 will normally be able to reflect at least about 25% of the incident light, and preferably at least about 85% of the incident light. The reflective layer is also deformable so that it conforms to the shape of a pit or bump 30 formed in the expansion or retention layers during the recording process.

A protective layer 32 will normally be provided adjacent the reflective layer 28 in order to protect the side of the disk opposite the plastic substrate layer 22. The composition of the protective layer 32 is not critical, but it will usually be compliant so that it can conform to the bump 30 in the reflective layer 28, preferably without forming a corresponding bump on its exposed surface.

Details of the construction of the disk 12' are provided in copending application Ser. No. 294,723, which has previously been incorporated herein by reference.

The bump 30 is formed in the expansion layer 24, retention layer 26, and reflective layer 28 by brief exposure to a laser light beam having first preselected characteristics chosen to expand an exposed region within the expansion layer. Typically, the expansion layer will have an incorporated dye which is able to preferentially absorb light of the wavelength projected by the write laser. The resulting expansion in the expansion layer 24 deforms the retention layer which has been heated above its glass transition temperature and is thus in a malleable condition. Once the laser light beam is turned off, the retention layer will quickly cool to below its glass transition temperature thus retaining the bump structure 30 as illustrated in FIG. 2. While the expansion layer 24 will tend to contract after cooling, it is held in the bump configuration by attachment to the now rigid retention layer 26.

To erase the bump 30 in FIG. 2, it is necessary to expose the retention layer to light radiation which selectively heats the retention layer (to cause it to exceed its glass transition temperature) without substantial heating of the expansion layer 24. This is accomplished by using light of second selected characteristics, particularly light having a wavelength which is preferentially absorbed by the retention layer 26 but not by the expansion layer 24. By thus heating the retention layer 26 above its glass transition temperature, the viscoelastic forces within the retention layer will tend to flatten out the bump 30, as illustrated in FIG. 3. The flattening process is enhanced by the stress present in the expanded portion of the expansion layer 24, further causing the bump 30 to flatten out.

The light tube 16 may be any linear element capable of projecting a relatively intense curtain of light along the radial path 20. Conveniently, the light tube 16 will be an arc lamp, such as a carbon arc lamp, a flame arc lamp, a metallic electrode arc lamp, a xenon arc lamp, or the like, preferably being a xenon arc lamp. The light tube 16 must be able to produce light having a sufficient intensity within the required wavelength range so as to effect erasure of the physical change within the optical disk 12, typically producing from about 100 to 3000 joules in about 100 $\mu$sec of exposure, and preferably producing from about 500 to 1000 joules during such exposure. The intensity of light incident on the optical disk will also depend on the distance between the light tube 16 and the exposed surface of the disk, typically being in the range from about 10 to 50 millimeters, and preferably being in the range from about 15 to 30 millimeters. The light tube 16 will provide light within the range of wavelengths selected to effect erasure (in preference to recordation), with the particular wavelengths depending on the nature of the materials of construction of the disk 12. Often, light from the light source will pass through a filter which removes light within the preferential recording wavelengths. Optionally, a narrow band pass filter may be provided to limit the range of wavelengths reaching the optical disk 12 to the preferred erasure wavelengths.

In erasing optical recording disks of the type just described, it is desirable that all locations on the disk 12 receives substantially the same unit dosage or unit exposure of the erasing light flux. The ability to achieve such an even distribution of light, however, is limited by the use of a linear light element, light tube 16, to project onto a rotating circular target, e.g., the optical disk 12. As the outer portions of the disk 12 (i.e., those located near the periphery) are traveling faster than the inner portions (i.e., those located near the center), the total dosage received by each unit area near the outer portions will be less than that received by each unit area near the inner portions. As a consequence, the outer portions of the disk 12 will be heated less rapidly than the inner portions, requiring that the total treatment time to erase the disk be a compromise between that which would be optimum for the outer portions and that which would be optimum for the inner portions.

To overcome this inherent imbalance, the system and method of the present invention will preferably be provided with a means for modifying the amount and/or intensity of the light flux which is delivered to the surface of the disk over time. Preferably, the light flux intensity will have a minimum in the range from about 0.2 to 2 joules/cm$^2$ near the axis to a maximum in the range from about 1 to 5 joules/cm$^2$ near the periphery of the disk. Alternatively, the intensity may be substantially constant within the range from about 0.2 to 5 joules/cm$^2$ where the width of the stripe varies from a minimum of 5 to 10 mm near the axis to a maximum in the range from about 15 to 20 mm near the periphery.

A first example of such a modifying means is illustrated in FIGS. 4-6 and comprises a mask element 40 having one or more elongate apertures 42 formed therein. The mask 40 is positioned between the light tube 16 and the exposed surface of optical disk 12, and the aperture 42 is tapered so that it is relatively narrow near the center of the disk and relatively broad near the outer periphery of the disk. In this way, the amount of light delivered to the disk from the light tube 16 is maximally attenuated near the center of the disk and increases in the direction toward the periphery of the disk. The precise dimensions of the aperture 42 can be selected to offset the decrease in light dosage which results from the varying speed of the disk, typically being within the ranges set forth above.

FIG. 4 further illustrates a mechanism for supporting and rotating the disk 12. The mechanism includes a motor 50 and a spindle 52. The motor 50 and spindle 52 may be conventional disk rotating systems, such as those provided in commercial compact disk players. The motor and disk will be able to rotate the disk at a preselected speed, typically in the range from about 10 to 100 rpm.

Referring now in particular to FIG. 5, a particular embodiment of the erasing system of the present invention is illustrated. The light tube 16' which spans diametrically across the entire disk 12 is provided together with a reflector 18' spanning the same distance. The mask 40' includes a pair of apertures 42 which function essentially as described in connection with FIG. 4 hereinabove. By using a light source which spans the entire disk, the total treatment time may be reduced as each portion of the disk will be exposed to the erasing light twice during a single revolution.

Referring now to FIG. 6, the particular embodiment of the mask 40" is illustrated. Here, the mask is generally circular and covers the entire exposed surface of disk 12, except for the aperture 42. The use of a mask which covers the entire surface of the disk is advantageous in that a stray light from the light source (not illustrated) will be blocked from striking the disk 12 except through the aperture 42.

Referring now to FIGS. 7 and 8, a second mechanism for modifying the light distribution from light tube 16 is illustrated. The mechanism comprises a reflector 60 having a geometry which is selected to provide a narrow beam width 62 proximate the peripheral portion of disk 12 in a broadened beam width 64 proximate the center portion of the disk. In this way, the portion of light striking the disk near the periphery having an intensity greater than the threshold intensity necessary to effect erasure is increased. Thus, the total dosage of light having an intensity greater than the threshold intensity will be equalized between the outer and inner portions of the disk. The specific geometry of the reflector 60 may be varied widely so long as it meets the objective stated above. As illustrated, the reflector 60 is a parabolic reflector having a focal length which is increasingly distant from the exposure surface of disk 12 as the position on the disk is closer to the center. Thus, the light striking the peripheral portions of the disk will be more focused than that striking the central portions.

Optionally, a filter 66 may be disposed between the light source 16 and the exposed surface of disk 12. The filter will serve to block light having a wavelength within the range capable of effecting recording on the disk, while allowing passage of light within the range of wavelengths allowing erasure of the disk.

Referring now to FIGS. 9 and 10, a third mechanism is illustrating for modifying the light flux which is delivered to the disk 12. The mechanism includes a parabolic reflector 70 which provides a substantially uniform light flux to a lens element 72. The lens element 72 has differing optical properties along its length such that a narrow beam 74 is focused near the periphery of disk 12 while a much broader beam 76 is projected near the center of the disk 12. The resulting energy distribution is substantially the same as that described for FIGS. 7 and 8 above.

Referring now to FIG. 11, an optical disk player 100 having an erasure system according to the present invention is illustrated. The player 100 is constructed similarly to a conventional compact disk player and includes a disk-receiving tray 102 which reciprocates in and out to receive a disk (which may be conventional or erasable as described above). In normal playback operation, the disk will be placed on the tray 102 with its data-containing side facing down so that it may be read by conventional optical and electrical systems disposed in the player.

The optical disk player 100, however, differs from a standard player in that it includes a removable top 104 (typically being hinged so that it may be flipped up) having a light tube 106 of the type described above. The light tube 106 is replaceably inserted in receptacles 108 so that the tube may be conveniently replaced by opening top 104. The light tube 106 is disposed to lie radially relative to the disk, as described above. An aperture plate 110 is disposed between the light tube 106 (when in its lowered position) and the disk when it is within the player. By turning the disk so that its erasable side faces upward, the disk may be erased by simply turning on light tube 106 and rotating the disk at a suitable speed. The electronics of the player may be easily modified to provide for erasure by pressing a single button (not illustrated). This design is inherently safe since a disk cannot easily be accidently erased since the disk must be placed in the player in an upside-down orientation for erasure to occur.

Although the foregoing invention has been described in detail for purposes of clarity of understanding, it will be obvious that certain modifications may be practiced within the scope of the appended claims.

What is claimed is:

1. A system for erasing an optical recording disk of the type having a surface which is responsive to light of first selected characteristics to produce a detectable physical change and is further responsive to light of second selected characteristics to reverse said physical change, said system comprising:
   means for projecting a curtain of light of said second characteristics; and
   means for rotating the optical disk relative to the projecting means so that said curtain of light is swept across the surface of the optical disk to reverse any physical changes which might have been present.

2. A system as in claim 1, wherein said means for projecting light provides a radial stripe of light on the surface of the optical disk.

3. A system as in claim 1, wherein said means for projecting light provides a diametrical stripe on the surface of the optical disk.

4. A system as in claim 1, wherein said means for rotating rotates the optical disk relative to a fixed light projecting means.

5. A system for erasing an optical recording disk of the type having a surface which is responsive to light of first selected characteristics to produce a detectable physical change and is further responsive to light of second selected characteristics to reverse said physical change, said system comprising:
   means for rotating said disk about a fixed axis normal to a preselected plane;
   a light tube capable of providing light of said second selected characteristics disposed radially from said axis and generally parallel to said plane, whereby light can be projected along a radial stripe on said surface as the disk is rotated; and
   means for modifying the light flux which strikes the surface of the disk in order to equalize the thermal effect of the light along the radial stripe.

6. A system as in claim 5, further comprising a filter element between the light tube and the preselected plane which passes light having said second selected characteristics in preference to light having said first selected characteristics.

7. A system as in claim 5, wherein the light tube is disposed diametrically relative to said fixed axis.

8. A system as in claim 5, wherein the light tube is a xenon tube.

9. A system as in claim 5, wherein the means for modifying the light flux is a mask having an elongate aperture radially aligned with the light tube, wherein the width of said aperture increases with distance from the axis.

10. A system as in claim 5, wherein the means for modifying the light flux is a reflector disposed on a side of the tube opposite to that of the disk, said reflector focusing the light so that the light striking the surface of the disk has an increasing flux density as the distance from the axis increases.

11. A system as in claim 5, wherein the means for modifying the amount or intensity of light is a lens disposed between the tube and the plane of the disk, said lens focusing the light so that the light striking the surface of the disk has an increasing flux density as the distance from the axis increases.

12. A system for selectively playing and erasing optical recording disks of the type having a surface which is responsive to light of first selected characteristics to produce a detectable physical change, said system comprising:
   an enclosure having a removable top;
   means for supporting and rotating the disk within the enclosure; and a light tube replaceably mounted in the removable top and positioned so that is lies radially adjacent the optical disk when the top is in place and the disk is within the enclosure, said light tube being capable of providing light of said second selected characteristics to effect erasure of the disk.

13. A system as in claim 12, further including an aperture plate disposed between the light tube and the disk supporting means.

14. A method for erasing an optical recording disk of the type having a surface which is responsive to light of first selected characteristics to produce a detectable physical change and is further responsive to light of second selected characteristics to reverse said physical change, said method comprising rotating said disk relative to a curtain of light of said second characteristics so that said surface is swept by said curtain, whereby any physical changes in the disk are reversed.

15. A method as in claim 14, wherein said detectable physical change is selected from the group consisting of geometric deformation and color change.

16. A method as in claim 15, wherein said detectable physical change consists of bump formation and light having said second selected characteristics causes relaxation of said bump.

17. A method as in claim 14, wherein the light which strikes the surface of the disk to effect erasure has been filtered to attenuate light having said first selected characteristics.

18. A method as in claim 14, wherein the disk is rotated at from about 10 to 100 rpm.

19. A method for erasing an optical recording disk of the type having a surface which is responsive to light of first selected characteristics to produce a detectable physical change and is further responsive to light of second selected characteristics to reverse said physical change, said method comprising:

rotating said disk about a fixed axis in a preselected plane;

projecting a radial stripe of light having said second selected characteristics onto the surface of said disk while it is being rotated, wherein the light flux intensity striking the surfaces increases as the distance from the axis increases.

20. A method as in claim 19, wherein the light striking the surface has a flux density from a minimum in the range from about 0.2 to 2 joules/$cm^2$ near the axis to a maximum in the range from about 1 to 5 joules/$cm^2$ near the periphery of the disk.

21. A method as in claim 19, wherein the light striking the surface has a flux density in the range from about 0.2 to 5 joules/$cm^2$ and the radial stripe has a width in the range from about 5 to 10 mm near the axis and a width in the range from about 15 to 20 mm near the periphery of the disk.

22. A method as in claim 19, wherein said detectable physical change is selected from the group consisting of geometric deformation and color change.

23. A method as in claim 20, wherein said detectable physical change consists of bump formation and light having said second selected characteristics causes relaxation of said bump.

24. A method as in claim 19, wherein the light which strikes the surface of the disk to effect erasure has been filtered to attenuate light having said first selected characteristics.

25. A method as in claim 19, wherein the disk is rotated at from about 10 to 100 rpm.

26. A system as in claim 12, wherein the removable top is hinged to the enclosure.

* * * * *